Patented Jan. 6, 1925.

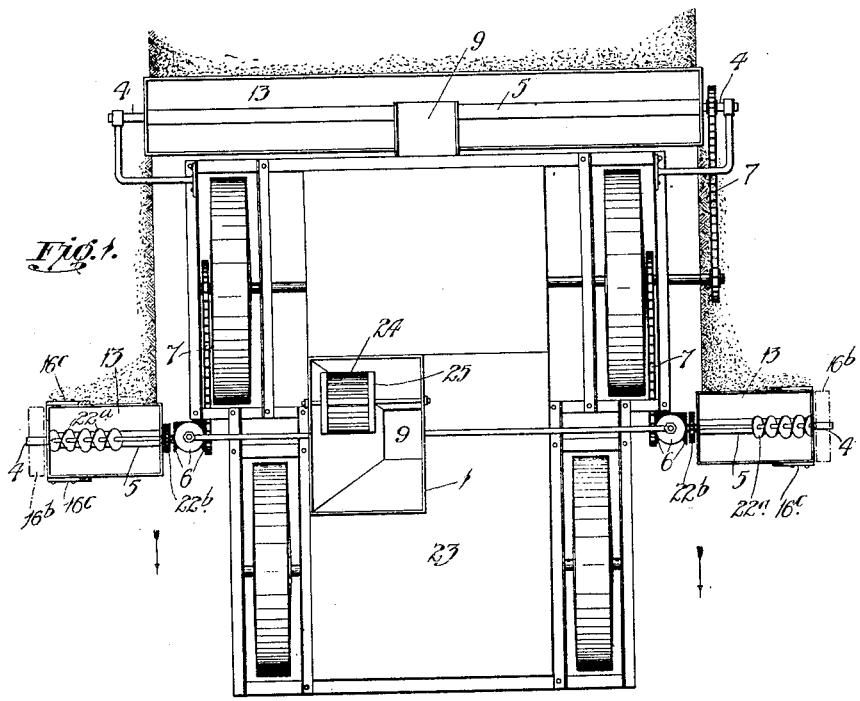

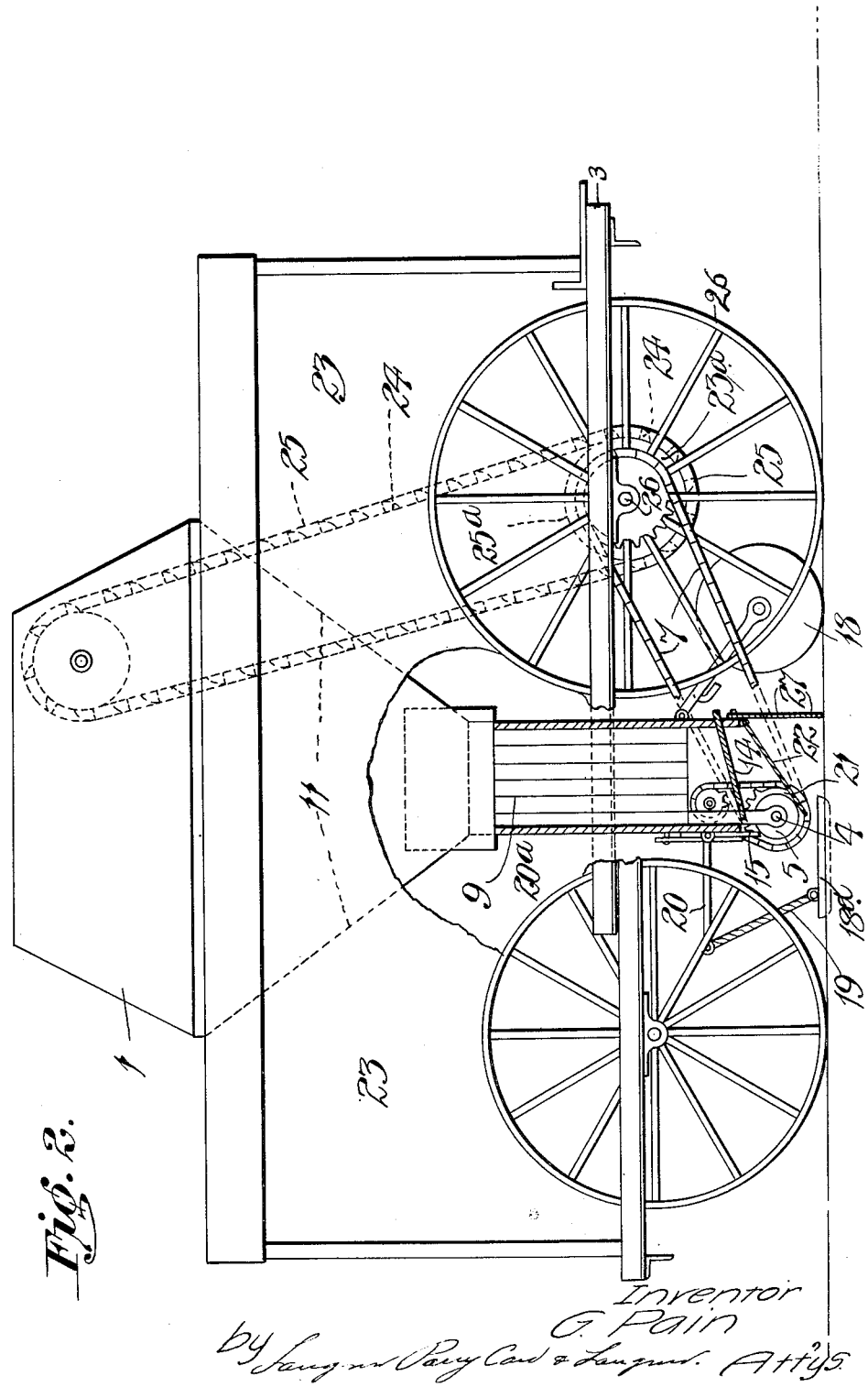

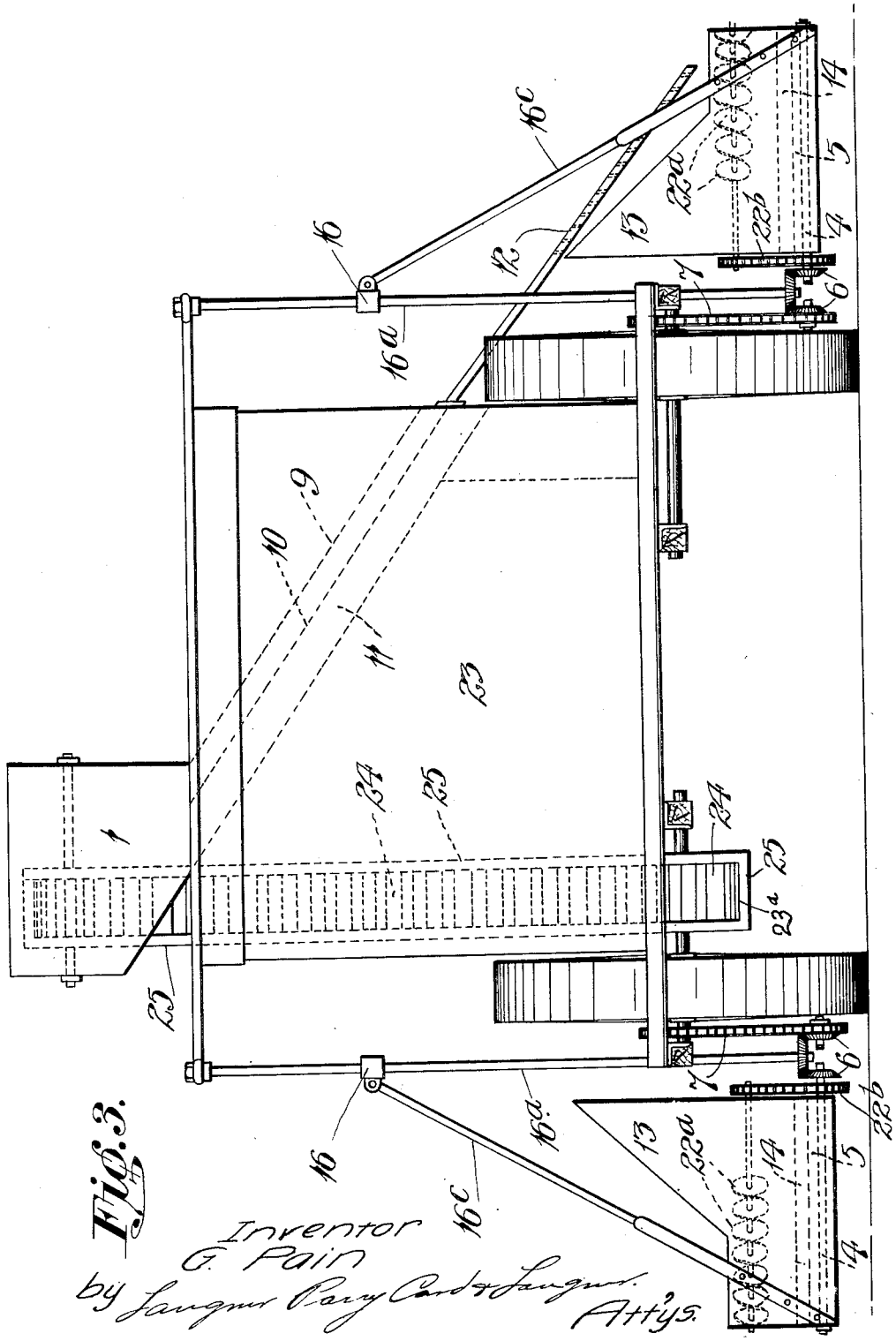

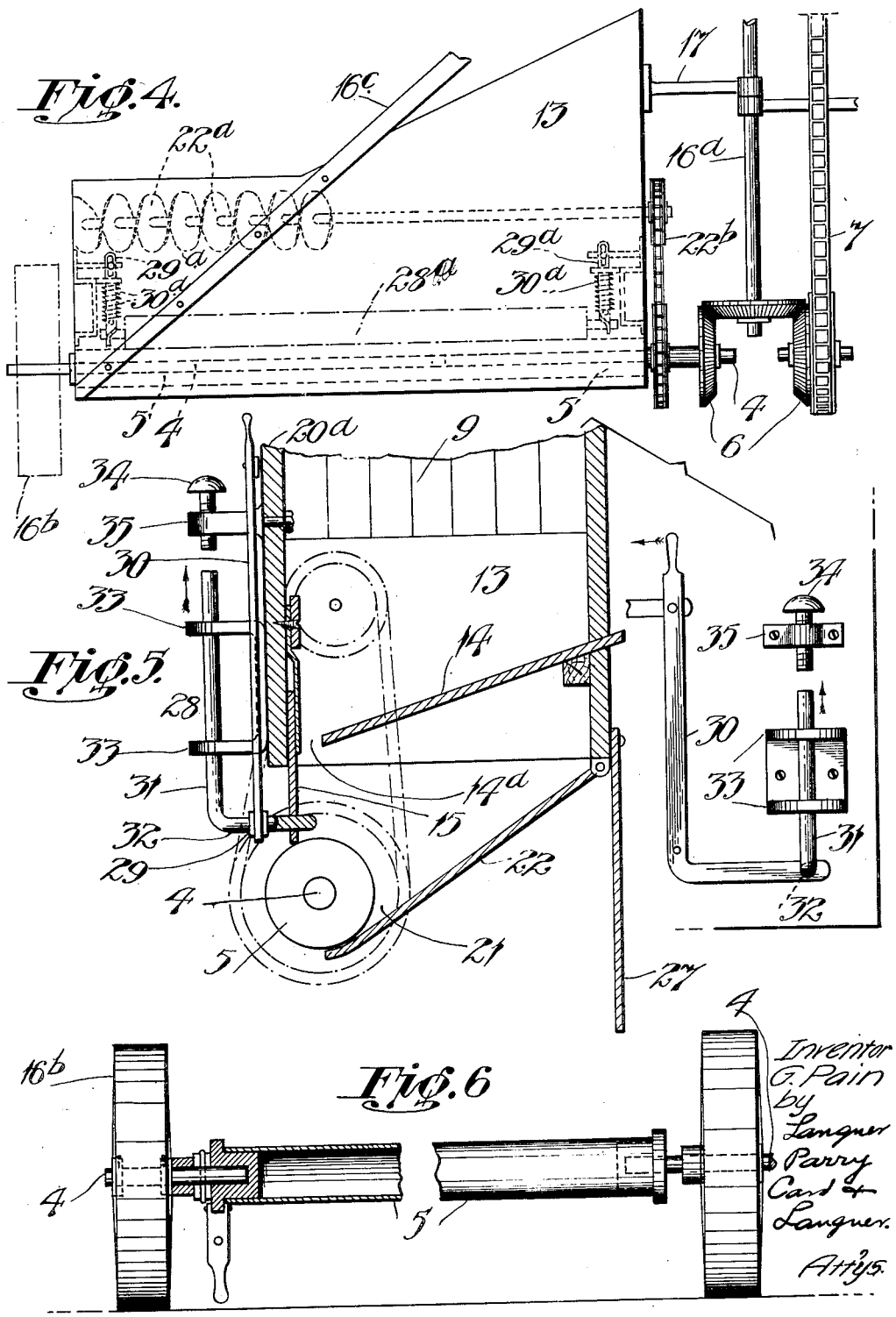

1,522,382

UNITED STATES PATENT OFFICE.

GEORGE PAIN, OF FLEMINGTON, NEAR MELBOURNE, VICTORIA, AUSTRALIA.

APPARATUS FOR SPREADING AND DISTRIBUTING LIME, SAND, MANURE, AND OTHER MATERIAL.

Application filed October 23, 1924. Serial No. 745,516.

*To all whom it may concern:*

Be it known that GEORGE PAIN, a citizen of the Commonwealth of Australia, and resident of Fenn Street, Flemington, near Melbourne, in the State of Victoria, Commonwealth of Australia, has invented a certain new and useful Apparatus for Spreading and Distributing Lime, Sand, Manure, and Other Material, of which the following is a specification.

This invention relates to apparatus for distributing lime, sand, manure and other material and has been devised in order to provide an implement which is of greater utility than those at present in use.

An essential feature embodied in the invention comprises means in a distributing apparatus whereby the width of sowing or spread of material can be varied according to requirements, and also thickness can be regulated to any width required within limits.

A further essential feature comprises spiral agitating mechanism adapted to lead or feed the material to a feeding roller.

A further essential feature consists in the use of one or a plurality of gauge plates and means for setting the gauge or for closing the same so that material may be either fed at regulated quantities and thickness, or the bin or box may be closed thus preventing the feeding of the material.

A further essential feature consists in the use, if desired, of a second roller in contact with the main feed roller which acts under spring compression with an adjustable movement during the delivery of the material.

A further essential feature consists in the use of a plain, fluted or perforated feeding roller or rollers or tube disposed below the bin and which may be formed in sections if desired around a driving spindle.

A further essential feature consists in means for adjusting the gauge plate or plates to regulate the feed, said means being characterized in that one or all the plates can be adjusted by set screws or bolts and further by a single lever control.

A further essential feature consists in providing a grille or grader disposed so that the material is graded prior to passing through the feeder of the distributor.

A further essential feature consists in providing a socket or space at the rear of the feed roller and a guide or lead so as to feed and hold the larger lumps of material, stones and the like and for the purposes of emptying out any material unsuitable for use.

A further essential feature consists in the provision of means for heating the material prior to the same passing to the roadway and this heating may be performed by a stove disposed in the path of the material in the chute leading to the delivery rollers or tubes of the distributor.

A further essential feature consists in providing a relieving floor so that the maximum weight is carried thereon and the material is delivered therethrough and into the distributing opening between the feeding roller and the gauge plate.

A further essential feature consists in the provision of a roller disposed behind swinging side distributors so that as the sand falls from said distributor on to a tarred or otherwise prepared roadway the roller follows on and presses the sand evenly into the tarred or other surface of the roadway.

A further essential feature consists in the provision of means for use when making or repairing tracks whereon tramway rails are laid, said means preventing the sand from percolating through the central opening between the rails and into the rails themselves, the means consisting of a slidable plate or shoe which follows the distributor and is positioned so that the sand cannot enter the tracks.

In order that the invention may be more readily understood it will now be described with reference to the accompanying drawings in which:—

Figure 1 is a view in plan.

Figure 2 is a view in side elevation, and

Figure 3 is a view in rear elevation of the improved machine.

Figures 4, 5 and 6 are views illustrating essential features embodied in the invention.

According to this invention a bin 1 or a plurality thereof with straight or diagonal sides tapering downwardly towards each other and towards the distributors to the feeders is provided.

This bin is arranged transversely of the machine and is mounted on any wheeled frame 3 or vehicle capable of being driven by horse draught or by power.

Arranged transversely of the machine are spindles which may consist of counter-shafts 4 on which are mounted feeding tubes or rollers 5.

Each tube or roller 5 is disposed conveniently and below the bottom of the bin 1, the spindle 4 of the roller being driven by bevel wheels 6 and sprocket and chain drive 7 from the axle or wheel of the vehicle.

The material on leaving the bin 1 is led to the said distributor or distributors operated as above described, the machine being provided with side distributors having feeding rollers 5 and similarly a feeding roller 5 is arranged at the rear to operate over the width of the machine to lap the side distributors.

The material from the bin 1 is delivered to the distributors above described by chutes 9 each divided along its length by a partition 10 and below the partition a heating element may be provided in the compartment 11 (not shown) to dry the material if so desired, particularly when distributing sand on a tarred road.

After passage through the chute 9 the material gravitates on to a grille 12 in each distributor casing 13 and drops by gravity through the girlle on to the feeding rollers 5.

At the outlet of the compartment leading to the roller 5 a sliding relieving floor 14 may be mounted so as to deflect the material through the opening 14$^a$ to the feeding roller 5.

The material passes between the roller 5 and a gauge plate 15 controlling the delivery of the material to the road.

Each distributor consists essentially of a long box of suitable size and length which moves suitably close to the roadway and delivers the material from each roller 5 thereon in even thickness and the width of the material deposit may be varied by increasing the distance between the main frame and distributor end, i. e. by swinging the side distributors 13 having the feeding rollers near to or away from the main carriage so the angle thereof is altered and varying widths deposited, the swinging of the distributing box or boxes 13 at the sides of the machine being obtained by pivoting the same at the point 16 to the main supply cart, and if necessary, the width of spread is controlled by a side stay 16$^a$ adjusted by suitable means and in this instance the bevel cogs 6 allow of the swinging of the distributor while maintaining the drive.

The driving bevel gearing can be made to follow the distributing device by mounting the same in a bracket 17 affixed to the side of the bin 1 carrying the material.

Alternatively an end wheel 16$^b$ may be mounted at the outer end of the distributor and the inner end then swings on the pivot 16, being controlled in both instances by a rod 16$^c$ supported in any suitable manner.

A roller 18 may be disposed behind the swinging distributors 13 so that as the sand falls from said distributor on to a tarred or otherwise prepared roadway the roller follows on and presses the sand evenly into the tarred or other surface of the roadway.

By arranging the roller 18 as described the sand is pressed into the tarred or other surface and prevented from blowing about and at the same time this arrangement prevents uneven distribution of sand as is present in hand sand laying where the sand is delivered in broad cast fashion which creates ridges of several layers of sand while the space between the ridges is barely covered.

Means are also embodied when making or repairing tracks whereon tramway rails are laid such means preventing the sand from percolating through the central opening between the rails and into the rails themselves, the means consisting of a slidable plate or shoe 18$^a$ which follows the distributor and is positioned so that the sand cannot enter the tracks, the plate or shoe 18$^a$ being suspended by a flexible or hinged connection 19 to an arm 20 extending from the distributor 13.

The gauge plate 15 of each distributor is slidably arranged or pivoted to the wall 20$^a$ of the gravity chute and is adjustably controlled by any suitable means such as a lever engaging a rack surface, so that the space between it and the feeding roller or tube 5 can be adjusted to regulate the delivery.

The gauge plate 15 for each of the distributors is preferably mounted and adjusted as illustrated, the gauge plate 15 being raised or lowered to adjust the size of delivery opening by two arms or links 28 pivotally connected at 29 to a control lever 30.

The links are bent similarly to a bell crank and at the bend are pivoted to the gauge plate, the ends 32 being fitted with rods 31 working in brackets 33 the movement of the rods being limited by contact with set screws 34 which are adjusted in the brackets 35 and thus the gauge plates are adjusted the movement being controlled by pulling on the lever 30.

Behind the rollers 5 is a space 21 to accommodate lumps that are too large to pass through the delivery opening and this space is closed by a hinged door 22 normally held up as illustrated but which may be opened to dump the accumulated material from the space 21.

In the distributors 13 above the rollers 5, an Archimedean or similar spiral screw 22$^a$ may be positioned suitably operated from the roller spindle 4 as by belt and sprockets 22$^b$ so as to spread the material over the whole surface of the roller 5.

Below the bin 1 is a supply box 23 of large volume and the sand or material is elevated from the supply box 23 to the bin 1 from the well 23ª which is always fed by gravity from the supply box, by bucket elevator 24 in a casing 25 driven from a pulley wheel 25ª on the travelling wheel 26.

The feeding rollers 5 may be plain fluted or perforated as desired.

A distributing apron 27 is disposed so that it acts on the material from each of the feeding rollers 5 so that the material is spread by the apron.

In operation the material is fed from the bin 1 which is continuously replenished by the elevator 24. The gauge plates 15 are adjusted to the delivery opening required between them and the feeding rollers 5. The material from the bin 1 is delivered through the chutes and grille on to the relieving floor 14 and through the opening 14ª to the feeding rollers 5. The material is spread evenly over the surface of the rollers 5 and consequently to the road by the assistance of the screws 22ª and thence to the distributing aprons 27.

In each distributor a second roller 28ª may be suspended by the arms 29ª so that it is normally in contact with its feeding roller 5, the arms 29ª acting under the compression of springs 30ª so that the roller 28ª upon the delivery of the material is free to move away from the roller 5 to allow the passage of the material and break up the material and this roller 28 may be disposed either above or to the side of the rollers 5.

I desire it to be understood that various improvements and modifications may be embodied without departing from the spirit and scope of the invention.

What I claim as my invention and desire to secure by Letters Patent is:—

1. A road building device, comprising, a vehicle, a material distributor carried by the vehicle and extending across the breadth of the vehicle, side distributors projecting from the vehicle and pivotally connected thereto, and material feed means for the distributors.

2. A road building device, comprising, a material distributor, material feeding means for the distributor, a rotatable distributing roller in the distributor, a material outlet adjacent the roller, the roller being positioned in the distributor to leave a pocket at that side of the roller opposite to the material outlet, and closure means in the distributor for emptying said pocket of accumulated material.

Signed at Melbourne, Victoria, Australia, this 23rd day of September, 1924.

GEORGE PAIN.

In the presence of—
ANUF F. UHLHOLM,
JEANNE C. L. BOUSTIERE.